United States Patent
Foster, Jr.

[11] Patent Number: 5,988,050
[45] Date of Patent: Nov. 23, 1999

[54] CONTAINER ASSEMBLY

[76] Inventor: Thomas E. Foster, Jr., 700 Chestnut St., Delanco, N.J. 08075

[21] Appl. No.: 09/168,463

[22] Filed: Oct. 8, 1998

[51] Int. Cl.[6] ............................. A23L 1/00; B65D 85/00
[52] U.S. Cl. ..................... 99/467; 99/646 C; 210/241; 210/464; 220/361; 220/371; 426/106; 426/118; 426/124
[58] Field of Search ................. 99/467, 472, 646 R, 99/646 C, 403–410, 416–418; 53/88, 432, 403, 510, 426, 110; 141/155; 62/62, 91, 239; 206/204, 205, 213.1; 220/361, 371, 335, 231, 252, 521, 902; 426/8, 106, 118, 124, 395, 418, 419, 398; 210/241, 419, 464–474; D7/667, 629, 538

[56] References Cited

U.S. PATENT DOCUMENTS

| | | | |
|---|---|---|---|
| D. 366,989 | 2/1996 | Zimmerman | D7/629 |
| 1,584,903 | 5/1926 | Supplee | 426/124 |
| 3,037,652 | 6/1962 | Wallace | 220/335 X |
| 3,586,201 | 6/1971 | Ebet | 220/371 X |
| 4,640,228 | 2/1987 | Sedlacek et al. | 426/106 X |
| 4,844,263 | 7/1989 | Hadtke | 220/361 X |
| 4,898,273 | 2/1990 | Kristiansen | 426/124 X |
| 5,139,834 | 8/1992 | Cole | 220/902 |
| 5,163,360 | 11/1992 | Petz | 99/467 |
| 5,398,811 | 3/1995 | Latella, Jr. | 99/472 X |
| 5,505,850 | 4/1996 | Licari | 210/464 |
| 5,766,660 | 6/1998 | Lee et al. | 426/118 |
| 5,853,581 | 12/1998 | Rayborn et al. | 210/241 |

Primary Examiner—Timothy Simone

[57] ABSTRACT

A container assembly for keeping food stored therein fresh. The container assembly includes a plurality of nested members each having a bowl-shaped configuration comprising exterior and interior surfaces, a base and a perimeter side wall extending upwardly around the base. The perimeter side wall terminating at an upper edge. The nested members include an outer bowl, a filter, and an inner bowl. The filter is rested inside the outer bowl. The inner bowl is rested inside the filter such that the filter is interposed between the inner and outer bowls. The inner bowl having a plurality of spaced apart holes therethrough. A lid assembly is provided for substantially covering upper opening of the outer bowl.

13 Claims, 3 Drawing Sheets

CONTAINER ASSEMBLY

BACKGROUND OF THE INVENTION

1. Field of the Invention

The present invention relates to food containers and more particularly pertains to a new container assembly for keeping food stored therein fresh.

2. Description of the Prior Art

The use of food containers is known in the prior art. More specifically, food containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,898,273; 4,844,263; Des. 366,989; 3,586,201; 3,037,652; and 1,584,903.

While these devices fulfill their respective, particular objectives and requirements, the aforementioned patents do not disclose a new container assembly. The inventive device includes a plurality of nested members each having a bowl-shaped configuration comprising exterior and interior surfaces, a base and a perimeter side wall extending upwardly around the base. The perimeter side wall terminating at an upper edge. The nested members include an outer bowl, a filter, and an inner bowl. The filter is rested inside the outer bowl. The inner bowl is rested inside the filter such that the filter is interposed between the inner and outer bowls. The inner bowl having a plurality of spaced apart holes therethrough. A lid assembly is provided for substantially covering upper opening of the outer bowl.

In these respects, the container assembly according to the present invention substantially departs from the conventional concepts and designs of the prior art, and in so doing provides an apparatus primarily developed for the purpose of keeping food stored therein fresh.

SUMMARY OF THE INVENTION

In view of the foregoing disadvantages inherent in the known types of food containers now present in the prior art, the present invention provides a new container assembly construction wherein the same can be utilized for keeping food stored therein fresh.

The general purpose of the present invention, which will be described subsequently in greater detail, is to provide a new container assembly apparatus and method which has many of the advantages of the food containers mentioned heretofore and many novel features that result in a new container assembly which is not anticipated, rendered obvious, suggested, or even implied by any of the prior art food containers, either alone or in any combination thereof.

To attain this, the present invention generally comprises a plurality of nested members each having a bowl-shaped configuration comprising exterior and interior surfaces, a base and a perimeter side wall extending upwardly around the base. The perimeter side wall terminating at an upper edge. The nested members include an outer bowl, a filter, and an inner bowl. The filter is rested inside the outer bowl. The inner bowl is rested inside the filter such that the filter is interposed between the inner and outer bowls. The inner bowl having a plurality of spaced apart holes therethrough. A lid assembly is provided for substantially covering upper opening of the outer bowl.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new container assembly apparatus and method which has many of the advantages of the food containers mentioned heretofore and many novel features that result in a new container assembly which is not anticipated, rendered obvious, suggested, or even implied by any of the prior art food containers, either alone or in any combination thereof.

It is another object of the present invention to provide a new container assembly which may be easily and efficiently manufactured and marketed.

It is a further object of the present invention to provide a new container assembly which is of a durable and reliable construction.

An even further object of the present invention is to provide a new container assembly which is susceptible of a low cost of manufacture with regard to both materials and labor, and which accordingly is then susceptible of low prices of sale to the consuming public thereby making such container assembly economically available to the buying public.

Still yet another object of the present invention is to provide a new container assembly which provides in the apparatuses and methods of the prior art some of the advantages thereof, while simultaneously overcoming some of the disadvantages normally associated therewith.

Still another object of the present invention is to provide a new container assembly for keeping food stored therein fresh.

Yet another object of the present invention is to provide a new container assembly which includes a plurality of nested members each having a bowl-shaped configuration comprising exterior and interior surfaces, a base and a perimeter side wall extending upwardly around the base. The perimeter side wall terminating at an upper edge. The nested members include an outer bowl, a filter, and an inner bowl. The filter is rested inside the outer bowl. The inner bowl is rested inside the filter such that the filter is interposed between the inner and outer bowls. The inner bowl having a plurality of spaced apart holes therethrough. A lid assembly is provided for substantially covering upper opening of the outer bowl.

Still yet another object of the present invention is to provide a new container assembly that can especially keep fruit and vegetables stored therein fresh.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
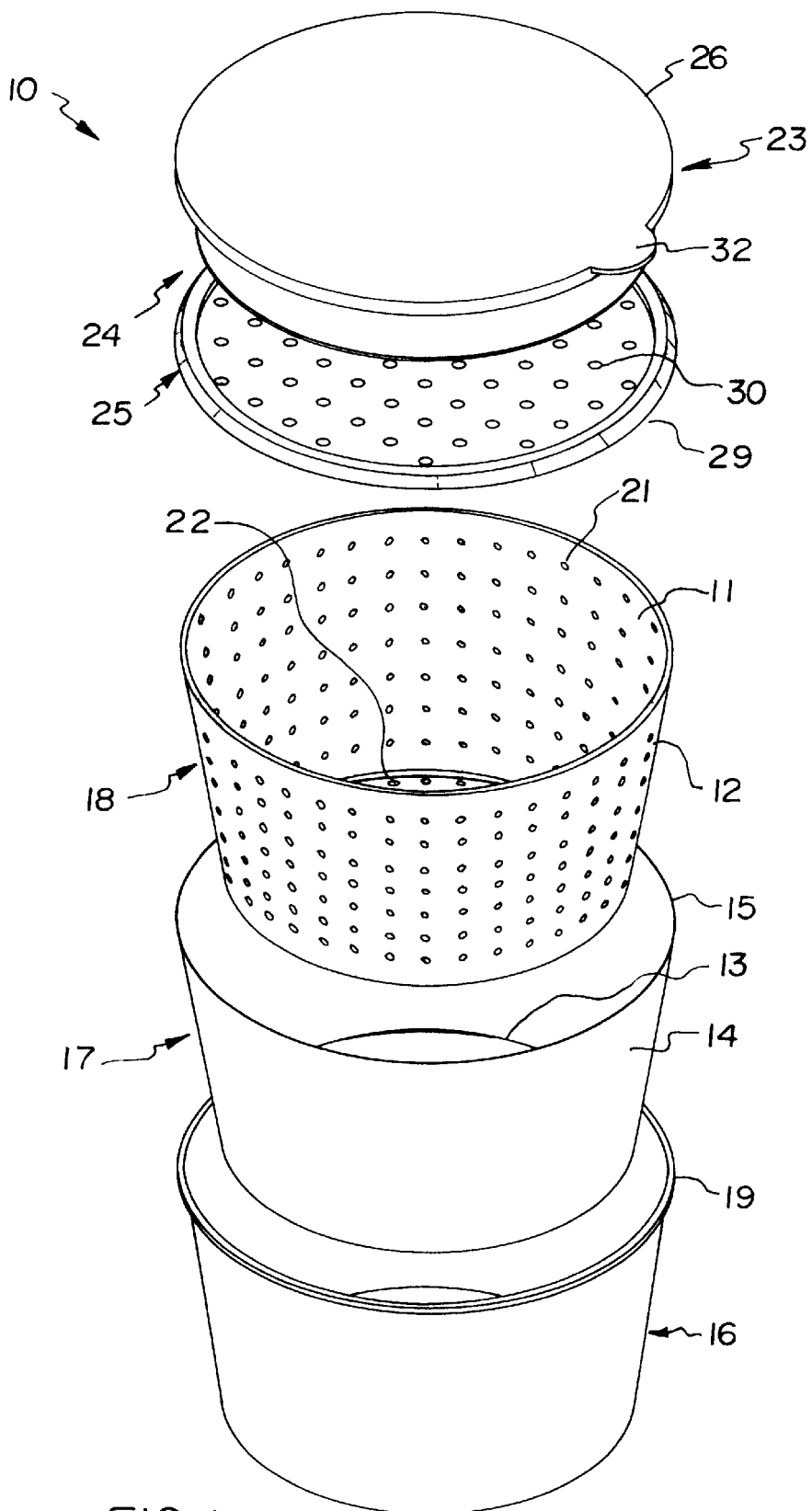
FIG. 1 is a schematic exploded perspective view of a new container assembly according to the present invention.
Figure 2:
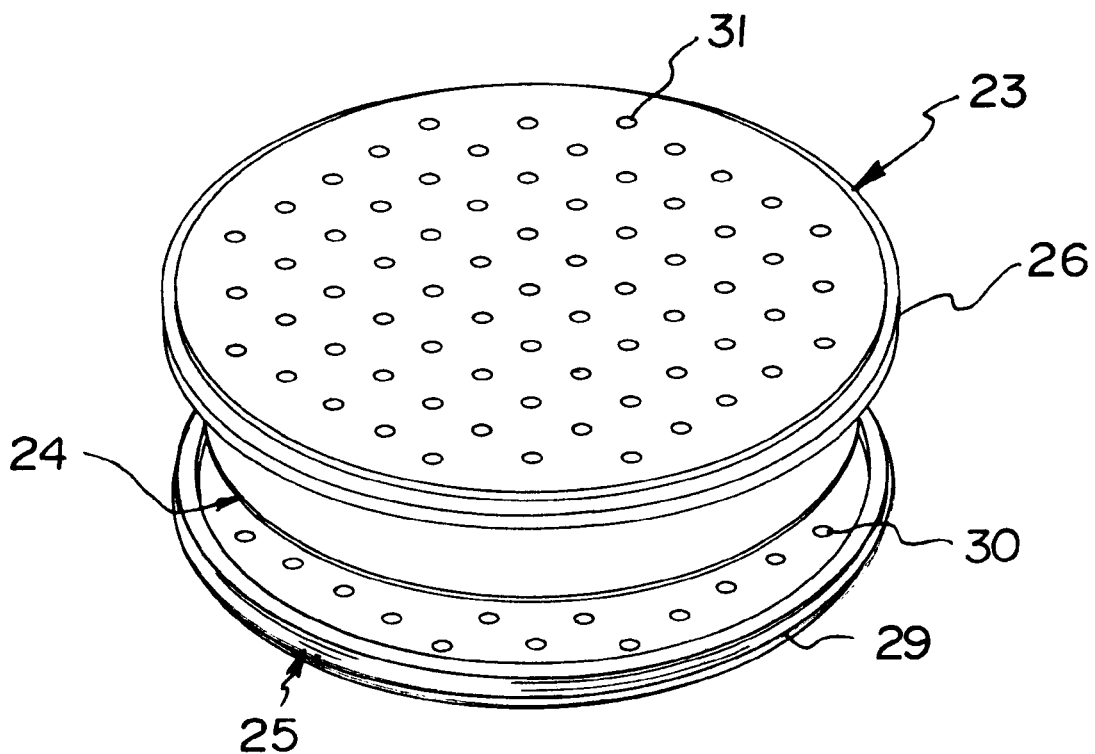
FIG. 2 is a schematic exploded perspective view of an optional embodiment of the lid assembly of the present invention having an upper lid with holes therethrough.
Figure 3:
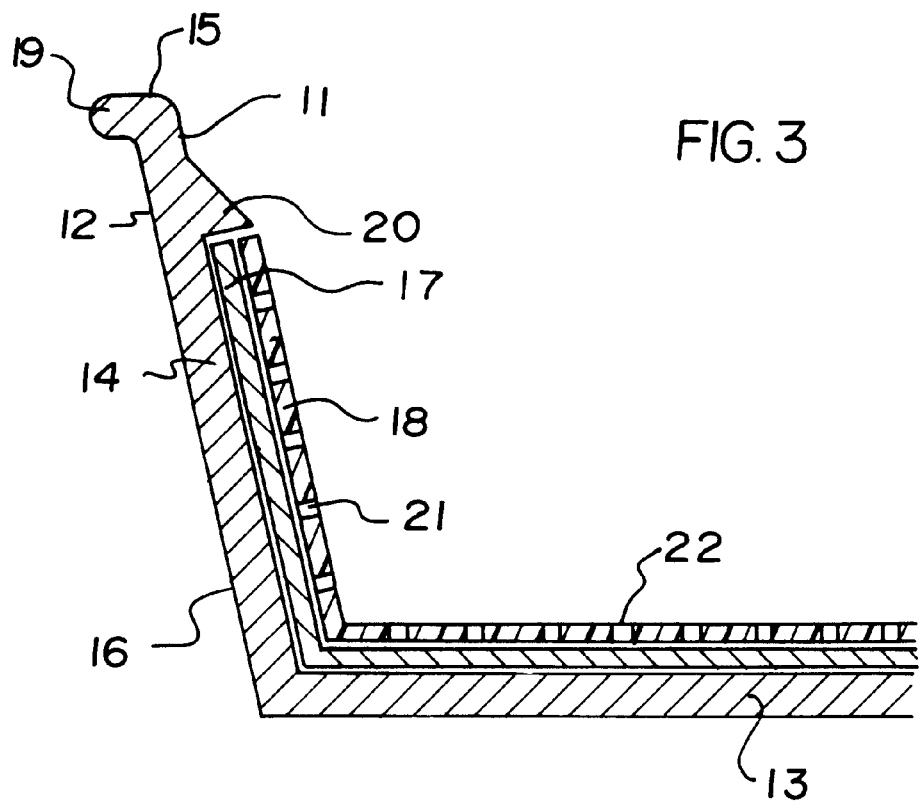
FIG. 3 is a schematic cross sectional view of the nested bowl members of the present invention.
Figure 4:
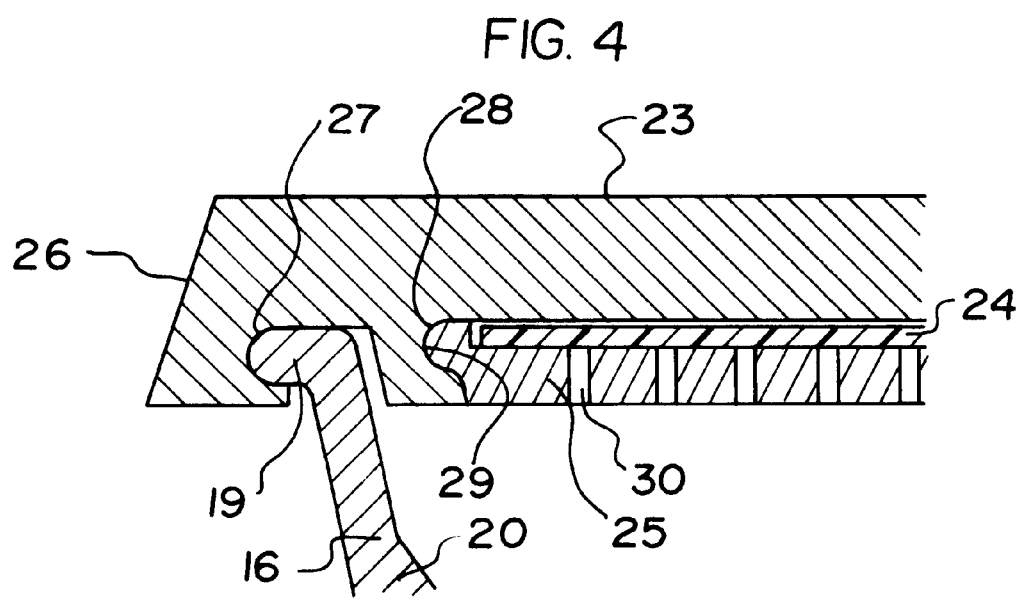
FIG. 4 is a schematic cross sectional view of the lid assembly of the present invention on the outer bowl.

With reference now to the drawings, and in particular to FIGS. 1 through 4 thereof, a new container assembly embodying the principles and concepts of the present invention and generally designated by the reference numeral 10 will be described.

As best illustrated in FIGS. 1 through 4, the container assembly 10 generally comprises a plurality of nested members each having a bowl-shaped configuration comprising exterior and interior surfaces 11,12, a base 13 and a perimeter side wall 14 extending upwardly around the base. The perimeter side wall terminates at an upper edge 15. The nested members include an outer bowl 16, a filter 17, and an inner bowl 18. The filter 17 is rested inside the outer bowl 16. The inner bowl 18 is rested inside the filter 17 such that the filter 17 is interposed between the inner and outer bowls 18,16. The inner bowl 18 having a plurality of spaced apart holes therethrough. A lid assembly 23,24,25 is provided for substantially covering upper opening of the outer bowl 16.

In closer detail, the container assembly 10 comprises a plurality of nested members each having a bowl-shaped configuration comprising exterior and interior surfaces 11,12, a base 13, and a perimeter side wall 14 extending upwardly around the base. The perimeter side wall terminates at an upper edge 15. It should be noted that the bowl-shaped configuration includes bowl container shapes having straight and curved perimeter side walls, and containers having a hemispherical, cylindrical, and rectangular configurations. The nested members including an outer bowl 16, a filter 17, and an inner bowl 18. The upper edge of the outer bowl 16 defines an upper opening into the outer bowl 16. The exterior surface of the outer bowl 16 having an outwardly extending lip 19 therearound adjacent the upper edge of the outer bowl 16. The interior surface of the outer bowl 16 having an inwardly extending extent 20 therearound. The extent 20 of the outer bowl 16 is located towards the upper edge of the outer bowl 16. Preferably, the extent 20 of the outer bowl 16 has a generally triangular transverse cross section and has a lower side lying in a plane generally parallel to the base of the outer bowl 16. The extent 20 is spaced apart from the base of the outer bowl 16 to define a receiving region therebetween around interior surface of the perimeter side wall of the outer bowl 16.

The filter 17 is rested inside the outer bowl 16 such that the base of the filter 17 rests on the base of the outer bowl 16 and the perimeter side wall of the filter 17 is positioned in the receiving region of the outer bowl 16. The filter 17 preferably comprises a breathable paper material so that air may flow through the filter 17 and is also adapted for absorbing fluids such as water such that the filter 17 may be soaked with water. The inner bowl 18 is rested inside the filter 17 such that the filter 17 is interposed between the inner and outer bowls 18,16. The base of the inner bowl 18 rests on the base of the filter 17 and the perimeter side wall of the inner bowl 18 is positioned in the receiving region of the outer bowl 16.

The inner bowl 18 has a plurality of spaced apart holes 21,22 therethrough between the interior and exterior surfaces of the inner bowl 18. A plurality of the holes 21 of the inner bowl 18 are located on the perimeter side wall of the inner bowl 18. Another plurality of the holes 22 of the inner bowl 18 are located on the base of the inner bowl 18. The holes 21 of the inner bowl 18 located on the perimeter side wall of the inner bowl 18 are arranged in a grid shape has a plurality of rows extending around the perimeter side wall of the inner bowl 18 and a plurality of columns extending between base of the inner bowl 18 and the upper edge of the inner bowl 18. The rows of holes 21 of the perimeter side wall of the inner bowl 18 lie in planes generally parallel to one another and generally parallel to the base of the inner bowl 18. The rows of holes 21 of the perimeter side wall of the inner bowl 18 are also preferably spaced apart at generally equal intervals. The columns of holes 21 of the perimeter side wall of the inner bowl 18 are preferably extended generally parallel to one another and generally perpendicular to the rows of holes of the perimeter side wall of the inner bowl 18. The columns of holes 21 of the perimeter side wall of the inner bowl 18 are also ideally spaced apart at generally equal intervals.

A lid assembly is preferably provided for substantially covering upper opening of the outer bowl 16. The lid assembly comprising an upper lid 23, a lower lid 25 and a lid filter 24 interposed between the upper and lower lids 23,25. The upper and lower lids 23,25 and the lid filter 24 each have top and bottom faces, and an outer periphery. Preferably, the outer peripheries of the upper and lower lids 23,25 and the lid filter 24 are generally circular or a similar shape to the upper edge of the outer bowl. The bottom face of the upper lid 23 rests on the upper edge of the outer bowl 16 to substantially cover the upper opening of the outer bowl 16. The bottom face the upper lid 23 has an annular sealing channel 27 extending along the outer periphery 26 of the upper lid 23. The sealing channel 27 of the upper lid 23 and the lip 19 of the outer bowl 16 are of complementary transverse cross sections such that upper lid 23 is releasably held to the outer bowl 16.

The bottom face of the upper lid 23 also has an inner groove 28 extending around the outer periphery 26 such that the sealing channel 27 of the upper lid 23 is interposed between the outer periphery of the upper lid 23 and the inner groove 28 of the upper lid 23. The inner groove 28 of the upper lid 23 defines a central region on the bottom face of the upper lid 23. The upper surface of the lid filter 24 is positioned adjacent the bottom surface of the upper lid 23 in the central region of the upper lid 23. The lid filter 24 comprising a breathable paper material so that air may flow through the lid filter 24 and is also adapted for absorbing fluids such as water such that the lid filter 24 may be soaked with water. The lower lid 25 is positioned in the central region of the upper lid 23 such that the lid filter 24 is interposed between the upper lid 23 and the lower lid 25. The lower lid 25 is held to the upper lid 23. In particular, the outer periphery 29 of the lower lid 25 and the inner groove 28 of the upper lid 23 are of complementary transverse cross sections such that the lower lid 25 is releasably held to the upper lid 23.

The lower lid 25 also has a plurality of holes 30 therethrough between the top and bottom surfaces of the lower lid 25. The holes 30 of the lower lid 25 permit passage of air therethrough. Preferably, the holes of the lower lid 25 are spaced apart from one another and arranged in a grid-like fashion has a plurality of rows and columns. Optionally, the upper lid 23 may also have a plurality of holes 31 therethrough between the top and bottom surfaces of the upper lid 23. These holes 31 also permit passage of air therethrough. The holes 31 of the upper lid 23 are also preferably spaced apart from one another and arranged in a grid-like fashion has a plurality of rows and columns.

Ideally, the outer periphery 26 of the upper lid 23 has a lift tab 32 outwardly extending therefrom. The lift tab 32 is adapted for aiding removal of the lid assembly from the outer bowl 16. The lift tab 32 and the upper lid 23 lying in a generally common plane. Ideally, the inner and outer bowls 18,16 and the upper and lower lids 23,25 all comprise a plastic material that is resiliently flexible enough to permit sufficient flexing to detach the lids from the bowls. Optionally, the inner and outer bowls 18,16 and the upper and lower lids 23,25 may all comprise wax or plastic coated paper such as used in disposable food containers.

In use, foodstuffs may be placed in the inner bowl 18 nested in the outer bowl 16 with the lid assembly covering the outer bowl. The filters 17,24 should preferably be soaked with water before placing foodstuff in the container assembly to help keep the foodstuff fresh during storage in the container assembly To open the container assembly, a user preferably squeezes the sides of the outer bowl to slightly deform the outer bowl so that the inner bowl can be detached from the outer bowl. The lift tab may be used to help lift the lid assembly off of the outer bowl.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container assembly comprising:

a plurality of nested members each having a bowl-shaped configuration comprising exterior and interior surfaces, a base and a perimeter side wall extending upwardly around said base, said perimeter side wall terminating at an upper edge;

said nested members including an outer bowl, a filter, and an inner bowl;

said upper edge of said outer bowl defining an upper opening into said outer bowl;

said filter being rested inside said outer bowl;

said inner bowl being rested inside said filter such that said filter is interposed between said inner and outer bowls; and said inner bowl having a plurality of spaced apart holes therethrough.

2. The container assembly of claim 1, wherein said interior surface of said outer bowl has an inwardly extending extent therearound, said extend of said outer bowl being located towards said upper edge of said outer bowl, said extent being spaced apart from said base of said outer bowl to define a receiving region therebetween around interior surface of said perimeter side wall of said outer bowl, said perimeter side wall of said filter being positioned in said receiving region of said outer bowl, and said perimeter side wall of said inner bowl being positioned in said receiving region of said outer bowl.

3. The container assembly of claim 1, wherein a plurality of said holes of said inner bowl are located on said perimeter side wall of said inner bowl, and another plurality of said holes of said inner bowl are located on said base of said inner bowl.

4. The container assembly of claim 3, wherein said holes of said inner bowl located on said perimeter side wall of said inner bowl are arranged in a grid shape having a plurality of rows extending around said perimeter side wall of said inner bowl and a plurality of columns extending between base of said inner bowl and said upper edge of said inner bowl, said rows of holes of said perimeter side wall of said inner bowl lying in planes generally parallel to one another and generally parallel to said base of said inner bowl, said rows of holes of said perimeter side wall of said inner bowl being spaced apart at generally equal intervals, said columns of holes of said perimeter side wall of said inner bowl being extended generally parallel to one another and generally perpendicular to said rows of holes of said perimeter side wall of said inner bowl, said columns of holes of said perimeter side wall of said inner bowl being spaced apart at generally equal intervals.

5. The container assembly of claim 1, further comprising a lid assembly for substantially covering upper opening of said outer bowl, said lid assembly comprising an upper lid, a lower lid and a lid filter interposed between said upper and lower lids, said upper and lower lids and said lid filter each having top and bottom faces, and an outer periphery.

6. The container assembly of claim 5, wherein said bottom face of said upper lid rests on said upper edge of said outer bowl to substantially cover said upper opening of said outer bowl.

7. The container assembly of claim 5, wherein said exterior surface of said outer bowl has an outwardly extending lip therearound adjacent said upper edge of said outer bowl, wherein said bottom face said upper lid has sealing channel extending along said outer periphery of said upper lid, said sealing channel of said upper lid and said lip of said outer bowl being of complementary transverse cross sections such that upper lid is held to said outer bowl.

8. The container assembly of claim 5, wherein said bottom face of said upper lid has an inner groove extending around said outer periphery, said inner groove of said upper lid defining a central region on said bottom face of said upper lid, said lid filter being positioned in said central region of said upper lid, said lower lid being positioned in said central region of said upper lid such that said lid filter is interposed between said upper lid and said lower lid, said lower lid being held to said upper lid.

9. The container assembly of claim 8, wherein said outer periphery of said lower lid and said inner groove of said upper lid are of complementary transverse cross sections such that said lower lid is held to said upper lid.

10. The container assembly of claim 5, wherein said lower lid has a plurality of holes therethrough between said top and bottom surfaces of said lower lid.

11. The container assembly of claim 5, wherein said upper lid has a plurality of holes therethrough between said top and bottom surfaces of said upper lid.

12. A container assembly comprising:

a plurality of nested members each having a bowl-shaped configuration comprising exterior and interior surfaces, a base and a perimeter side wall extending upwardly around said base, said perimeter side wall terminating at an upper edge;

said nested members including an outer bowl, a filter, and an inner bowl;

said upper edge of said outer bowl defining an upper opening into said outer bowl;

said exterior surface of said outer bowl having an outwardly extending lip therearound adjacent said upper edge of said outer bowl;

said interior surface of said outer bowl having an inwardly extending extent therearound, said extend of said outer bowl being located towards said upper edge of said outer bowl, said extent of said outer bowl having a generally triangular cross section and having a lower side lying in a plane generally parallel to said base of said outer bowl;

said extent being spaced apart from said base of said outer bowl to define a receiving region therebetween around interior surface of said perimeter side wall of said outer bowl;

said filter being rested inside said outer bowl such that said base of said filter rests on said base of said outer bowl and said perimeter side wall of said filter is positioned in said receiving region of said outer bowl;

said filter comprising a paper material adapted for absorbing water such that said filter may be soaked with water;

said inner bowl being rested inside said filter such that said filter is interposed between said inner and outer bowls, said base of said inner bowl resting on said base of said filter and said perimeter side wall of said inner bowl being positioned in said receiving region of said outer bowl;

said inner bowl having a plurality of spaced apart holes therethrough between said interior and exterior surfaces of said inner bowl, a plurality of said holes of said inner bowl being located on said perimeter side wall of said inner bowl, another plurality of said holes of said inner bowl being located on said base of said inner bowl;

said holes of said inner bowl located on said perimeter side wall of said inner bowl being arranged in a grid shape having a plurality of rows extending around said perimeter side wall of said inner bowl and a plurality of columns extending between base of said inner bowl and said upper edge of said inner bowl;

said rows of holes of said perimeter side wall of said inner bowl lying in planes generally parallel to one another and generally parallel to said base of said inner bowl, said rows of holes of said perimeter side wall of said inner bowl being spaced apart at generally equal intervals;

said columns of holes of said perimeter side wall of said inner bowl being extended generally parallel to one another and generally perpendicular to said rows of holes of said perimeter side wall of said inner bowl, said columns of holes of said perimeter side wall of said inner bowl being spaced apart at generally equal intervals;

a lid assembly for substantially covering upper opening of said outer bowl, said lid assembly comprising an upper lid, a lower lid and a lid filter interposed between said upper and lower lids, said upper and lower lids and said lid filter each having top and bottom faces, and an outer periphery, wherein said outer peripheries of said upper and lower lids and said lid filter are generally circular;

said bottom face of said upper lid resting on said upper edge of said outer bowl to substantially cover said upper opening of said outer bowl, said bottom face said upper lid having sealing channel extending along said outer periphery of said upper lid, said sealing channel of said upper lid and said lip of said outer bowl being of complementary transverse cross sections such that upper lid is held to said outer bowl;

said bottom face of said upper lid having an inner groove extending around said outer periphery such that said sealing channel of said upper lid is interposed between said outer periphery of said upper lid and said inner groove of said upper lid, said inner groove of said upper lid defining a central region on said bottom face of said upper lid;

said upper surface of said lid filter being positioned adjacent said bottom surface of said upper lid in said central region of said upper lid;

said lid filter comprising a paper material adapted for absorbing water such that said lid filter may be soaked with water;

said lower lid being positioned in said central region of said upper lid such that said lid filter is interposed between said upper lid and said lower lid;

said lower lid being held to said upper lid, said outer periphery of said lower lid and said inner groove of said upper lid being of complementary transverse cross sections such that said lower lid is held to said upper lid;

said lower lid having a plurality of holes therethrough between said top and bottom surfaces of said lower lid, said holes of said lower lid being spaced apart from one another and arranged in a grid-like fashion having a plurality of rows and columns; and wherein said outer periphery of said upper lid having a lift tab outwardly extending therefrom, said lifting tab being adapted for aiding removal of said lid assembly from said outer bowl, said lift tab and said upper lid lying in a generally common plane.

13. The container assembly of claim 12, wherein said upper lid has a plurality of holes therethrough between said top and bottom surfaces of said upper lid.

* * * * *